United States Patent Office 3,149,125
Patented Sept. 15, 1964

3,149,125
XANTHENE-9-METHYL DIALKYLAMINO-
ALKANOATES
Kurt J. Rorig, Glenview, Ill., assignor to G. D. Searle &
Co., Chicago, Ill., a corporation of Delaware
No Drawing. Filed Nov. 27, 1961, Ser. No. 155,160
7 Claims. (Cl. 260—335)

This invention relates to xanthene-9-alkyl dialkyl-aminoalkanoates and processes for the preparation thereof. More particularly, this invention relates to chemical compounds of the formula

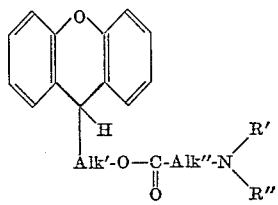

wherein Alk′ and Alk″ represent alkylene radicals and R′ and R″ represent alkyl radicals. Among the alkylene radicals represented by Alk′ and Alk″, especially lower alkylene radicals are preferred, which is to say bivalent, saturated, acyclic, straight- or branched-chain hydrocarbon groupings of the formula

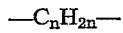
—$C_nH_{2n}$— wherein $n$ represents a positive integer ordinarily less than 5. Illustrative of such radicals are methylene, ethylene, propylene, trimethylene, 2-methylpropylene, tetramethylene, etc. Likewise the alkyl radicals represented by R′ and R″ are desirably of lower order, such as methyl, ethyl, propyl, isopropyl, butyl, sec-butyl, tert-butyl, pentyl, neopentyl, hexyl, heptyl, and like monovalent, saturated, acyclic, straight- or branched chain hydrocarbon groupings of the formula

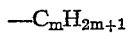
—$C_mH_{2m+1}$ wherein $m$ represents a positive integer ordinarly less than 8.

Equivalent to the foregoing tertiary amines for present purposes are non-toxic acid addition and quaternary ammonium salts thereof, the composition of which may be delineated thus

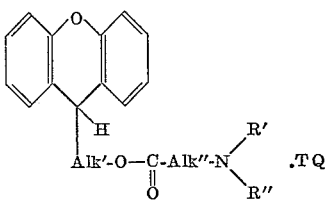

wherein Alk′, Alk″, R′, and R″ retain the meanings previously assigned; T represents hydrogen or a lower alkyl, hydroxy(lower alkyl), or lower alkenyl radical, or an aralkyl radical such as a benzyl, phenylethyl, or naphthylmethyl groupings; and Q represents an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which, in combination with the cationic portion of a salt aforesaid, is neither pharmacologically nor otherwise undesirable in physiologic dosage.

The compounds to which this invention relates are useful because of their valuable pharmacological properties. For example, the tertiary bases hereof and their acid addition salts manifest a papaverine-like capacity to directly counteract smooth muscle spasm, whereas the corresponding quaternary ammonium salts function like tetraethylammonium bromide to block autonomic ganglionic nerve impulse transmission. These properties are to be distinguished from the spasmolytic effects of substances such as atropine, which act preponderantly at the neuro-effector junctions of the autonomic nervous system.

Preparation of the subject compounds proceeds by heating a 9-xanthenealkanol

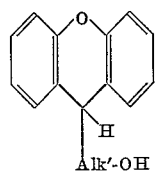

with an appropriate chloroalkanoyl chloride

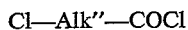
Cl—Alk″—COCl (Alk′ and Alk″ being defined as before) in an inert solvent such as benzene or ether, using a tertiary base such as pyridine as an acid acceptor if desired, to give a corresponding 9-xanthenealkyl chloroalkanoate

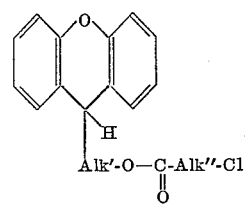

which, in turn, is heated with an appropriate secondary amine

(R′ and R″ being defined as before), in an inert solvent medium such as butanone and catalyzed with sodium iodide, to give a corresponding tertiary amine of the invention. The latter reaction is carried out in a sealed vessel to the extent necessary to prevent loss by volatilization of the secondary amine in process. Conversion of the tertiary amine to its acid addition salt is accomplished by simple admixture with one equivalent of any of various inorganic and strong organic acids, the anionic portion of which conforms to Q as hereinabove defined. The quaternary ammonium compounds comprehended are derived by contacting a selected tertiary amine with one equivalent of an organic ester of the formula

TQ

T and Q being limited by the meanings hereinbefore assigned and it being additionally provided that T does not represent hydrogen. Quaternization takes place in the temperature range between 25 degrees and 200 degrees centigrade, using an inert solvent such as chloroform, acetone, butanone, methanol, butanol, or the like as reaction medium. Quaternization is ordinarily completed in from 1 to 48 hours and is generally carried out in a closed system if a lower alkyl halide—such as methyl chloride—is one of the reagents. Using methyl bromide, the manufacture of quaternary salts may be smoothly effected in butanone solution at 70 degrees centigrade, the reaction time being approximately 1 hour.

The following examples describe in detail compounds illustrative of the present invention and methods which have been devised for their manufacture. However the invention is not to be construed as limited thereby, either in spirit or in scope, since it will be apparent to those skilled in the art that many modifications, both of materials and of methods, may be practiced without departing from the purpose and intent of this disclosure. Throughout the examples hereinafter set forth, temperatures are given in degrees centigrade, pressures in millimeters of mercury, and relative amounts of material in parts by weight, except as otherwise noted.

EXAMPLE 1

A. *9-xanthenemethyl chloroacetate.*—A solution of 90 parts of 9-xanthenemethanol and 57 parts of chloroacetyl chloride in 265 parts of benzene is heated to boiling at a rate such that evolution of hydrogen chloride is not unduly vigorous, and maintained at the boiling point under reflux for ½ hour. Removal of solvent by distillation and recrystallization of the residue from hexane (B.P. 60–71°) affords 9-xanthenemethyl chloroacetate melting at 80–84°.

B. *9-xanthenemethyl diethylaminoacetate.*—A solution of 58 parts of 9-xanthenemethyl chloroacetate, 33 parts of diethylamine, and 1 part of sodium iodide in 200 parts of butanone is heated at the boiling point under reflux for 12 hours, whereupon the butanone is removed by vacuum distillation and the residue taken up in 5% hydrochloric acid. The acid extract is washed with ether and then basified with aqueous concentrated sodium hydroxide. The oil thrown down is extracted with ether, and the ether extract is dried over anhydrous sodium sulfate and stripped of solvent by distillation. The residue, upon distillation in vacuo, affords 9-xanthenemethyl diethylaminoacetate boiling at 150–155° under 0.2 mm. pressure and having the formula

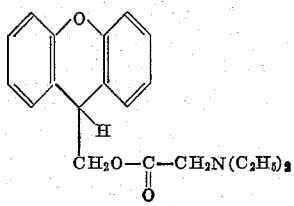

C. *9-xanthenemethyl diethylaminoacetate hydrochloride.*—To a solution of 16 parts of 9-xanthenemethyl diethylaminoacetate in 200 parts of anhydrous ether is added just sufficient hydrogen chloride to induce acidity. Precipitation of 9-xanthenemethyl diethylaminoacetate hydrochloride occurs. The product is filtered out and dried in vacuo. Being exceedingly hygroscopic, its melting point is indistinct under ordinary working conditions.

D. *9-xanthenemethyl diethylaminoacetate methobromide.*—Approximately 14 parts of methyl bromide is introduced beneath the surface of an ice-cold solution of 32 parts of 9-xanthenemethyl diethylaminoacetate in 200 parts of butanone. The resultant solution is let stand in a sealed vessel to warm to room temperature, during the course of which crystalline 9-xanthenemethyl diethylaminoacetate methobromide is thrown down. When precipitation is complete, the produce is filtered off and washed with butanone. It melts at 164–167°.

EXAMPLE 2

A. *9-xanthenemethyl diisopropylaminoacetate.*—A solution of 58 parts of 9-xanthenemethyl chloroacetate, 45 parts of diisopropylamine, and 30 parts of sodium iodide in 120 parts of butanone is maintained in a sealed vessel at 65° for 15 hours. Solvent is then removed by vacuum distillation and the residue taken up in 5% hydrochloric acid. The acid extract is washed with water and thereafter made basic with aqueous concentrated sodium hydroxide. The oil thrown down is extracted with ether. The ether extract is dried over anhydrous sodium sulfate and stripped of solvent by distillation. Vacuum distillation of the residue affords 9-xanthenemethyl diisopropylaminoacetate boiling at 190–192° under 0.5 mm. pressure. The product has the formula

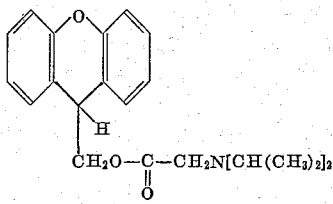

B. *9-xanthenemethyl diisopropylaminoacetate hydrochloride.*—To a solution of 8 parts of 9-xanthenemethyl diisopropylaminoacetate in 200 parts of anhydrous ether is slowly added with vigorous agitation just sufficient 2-propanolic hydrogen chloride to render the resultant mixture acid. The oil thrown down in process granules upon refrigeration of the mixture. Filtered off and recrystallized from a mixture of ethanol and ether, this material is too hygroscopic to afford a definitive melting point. The product thus isolated is 9-xanthenemethyl diisopropylaminoacetate hydrochloride.

C. *9-xanthenemethyl diisopropylaminoacetate methiodide.*—A solution of 10 parts of 9-xanthenemethyl diisopropylaminoacetate and 6 parts of methyl iodide in 450 parts of chloroform is maintained in a sealed vessel at about 25° for two weeks. Solvent is then removed by vacuum distillation. The residual oil, upon standing in contact with ether, crystallizes. The crystalline material, filtered off and recrystallized from a mixture of butanone and ether, affords 9-xanthenemethyl diisopropylaminoacetate methiodide melting at 121–124° with gas evolution.

EXAMPLE 3

A. *9-xanthenemethyl 3-chloropropionate.*—To a solution of 53 parts of 9-vanthenemethanol and 20 parts of pyridine in 425 parts of ether at 5–10° is slowly added a solution of 32 parts of 3-chloropropionyl chloride in 71 parts of ether. The resultant mixture is allowed to warm to room temperature, then heated at the boiling point under reflux for 10 minutes. The mixture thus obtained is consecutively washed with 200 parts of cold water, 200 parts of dilute hydrochloric acid, and twice more with 200 parts of water, whereupon it is dried over calcium sulfate and stripped of solvent by distillation. Vacuum distillation of the residue affords 9-xanthenemethyl 3-chloropropionate as a pale yellow oil boiling at 160–163° under 0.4 mm. pressure.

B. *9-xanthenemethyl 3-dimethylaminopropionate.*—Approximately 8 parts of dimethylamine is introduced beneath the surface of an ice-cold solution of 26 parts of 9-xanthenemethyl 3-chloropropionate in 40 parts of butanone. The resultant solution is let stand at about 25° in a sealed vessel for 15 hours, then heated to 80° for 6 hours. Butanone is removed by vacuum distillation and the residual oil taken up in 250 parts of 5% hydrochloric acid. The acid solution is washed with ether and then basified with aqueous concentrated sodium hydroxide. The oil thrown down is extracted with ether, whereupon the ether extract is dried over calcium sulfate and freed of solvent by distillation. The residue, 9-xanthenemethyl 3-dimethylaminopropionate is a pale yellow oil. The product has the formula

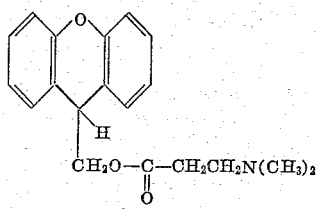

C. *9-xanthenemethyl 3-dimethylaminopropionate hydrochloride.*—Substitution of 8 parts of 9-xanthenemethyl 3-dimethylaminopropionate for the 9-xanthenemethyl diisopropylaminoacetate called for in Example 2B affords, by the procedure there detailed, 9-xanthenemethyl 3-dimethylaminopropionate hydrochloride melting at 179–181°.

D. *9-xanthenemethyl 3-dimethylaminopropionate methiodide.*—Substitution of 10 parts of 9-xanthenemethyl 3-dimethylaminopropionate for the 9-xanthenemethyl diisopropylaminoacetate called for in Example 2C affords, by the procedure there detailed, 9-xanthenemethyl 3-dimethylaminopropionate methiodide melting at approximately 194–195°.

E. *9-xanthenemethyl 3-dimethylaminopropionate methochloride.*—Approximately 10 parts of methyl chloride is introduced beneath the surface of a solution of 57 parts of 9-xanthenemethyl 3-dimethylaminopropionate in 750 parts of chloroform. The resultant solution is maintained in a sealed vessel at 45° for 6 hours, whereupon the chloroform is removed by distillation at reduced pressures and the residual oil taken up in approximately 200 parts of hot butanone and diluted with ether to incipient turbidity. From the turbid solution, upon cooling, 9-xanthenemethyl 3-dimethylaminopropionate methochloride precipitates which, filtered off and recrystallized from a mixture of ethanol and ether, melts at 166–170°. The product is hygroscopic.

EXAMPLE 4

A. *9-xanthenemethyl 3-diethylaminopropionate.*—Substitution of 13 parts of diethylamine for the dimethylamine called for in Example 3B affords, by the procedure there detailed, 9-xanthenemethyl 3-diethylaminopropionate, which is further purified by vacuum distillation. The product boils at 150–152° under 0.3 mm. pressure and has the formula

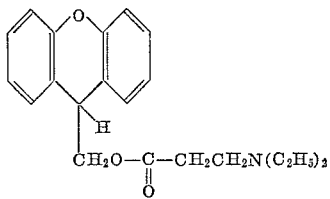

B. *9-xanthenemethyl 3-diethylaminopropionate hydrochloride.*—Substitution of 8 parts of 9-xanthenemethyl 3-diethylaminopropionate for the 9-xanthenemethyl diisopropylaminoacetate called for in Example 2B affords, by the procedure there detailed, 9-xanthenemethyl 3-diethylaminopropionate hydrochloride melting at 143–145°.

C. *9-xanthenemethyl 3-diethylaminopropionate methiodide.*—A solution of 80 parts of 9-xanthenemethyl 3-diethylaminopropionate and 34 parts of methyl iodide in 750 parts of chloroform is maintained in a sealed vessel at 25° for 72 hours. Removal of solvent by vacuum distillation affords as the residue 9-xanthenemethyl 3-diethylaminopropionate methiodide, the identity of which is confirmed by infrared analysis.

What is claimed is:
1. A compound of the formula

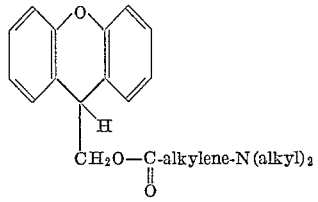

wherein the alkylene radical called for contains fewer than 5 carbon atoms and the alkyl radicals called for each contain fewer than 8 carbon atoms.

2. A compound of the formula

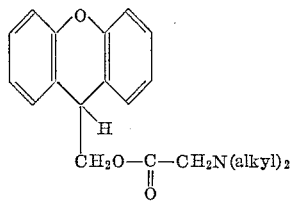

wherein the alkyl radicals called for each contain fewer than 8 carbon atoms.

3. 9-xanthenemethyl diethylaminoacetate.
4. 9-xanthenemethyl diisopropylaminoacetate.
5. A compound of the formula

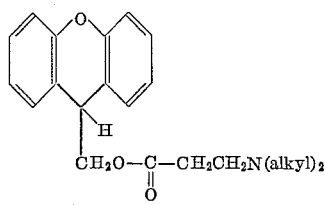

wherein the alkyl radicals called for each contain fewer than 8 carbon atoms.

6. 9-xanthenemethyl 3-dimethylaminopropionate.
7. 9-xanthenemethyl 3-diethylaminopropionate.

No references cited.